United States Patent [19]
Shoichi

[11] 3,799,183
[45] Mar. 26, 1974

[54] GOVERNOR VALVE ASSEMBLY FOR AN AUTOMATIC TRANSMISSION
[75] Inventor: Ohshima Shoichi, Tokyota, Japan
[73] Assignee: Toyota Jidosha Kogyo Kabushiki Kaisha, Toyota-shi, Aichi-ken, Japan
[22] Filed: June 8, 1972
[21] Appl. No.: 260,894

[30] Foreign Application Priority Data
  Nov. 5, 1971  Japan.............................. 46-87610

[52] U.S. Cl. ................................ 137/56, 74/752 C
[51] Int. Cl. ........................................... G05d 13/10
[58] Field of Search...................... 137/56; 74/752 C

[56] References Cited
UNITED STATES PATENTS

| | | | |
|---|---|---|---|
| 2,876,784 | 3/1959 | Adams.................................. | 137/56 |
| 3,212,514 | 10/1965 | Kelley................................... | 137/56 |
| 3,401,709 | 9/1968 | Miller................................... | 137/56 |
| 3,420,251 | 1/1969 | Forster et al. ..................... | 137/56 X |
| 3,566,894 | 3/1971 | Satoh.................................. | 137/56 X |
| 3,633,595 | 1/1972 | Nagamatsu .......................... | 137/56 |

*Primary Examiner*—Benjamin W. Wyche
*Assistant Examiner*—J. Reep
*Attorney, Agent, or Firm*—Toren, McGeady and Stanger

[57] ABSTRACT

A governor valve assembly for use with an automatic transmission is rotatably mounted on the output shaft of the transmission and is secured against axial displacement along the shaft. The valve assembly includes at least one chamber having an inlet port for introducing a pressurized fluid medium into the valve assembly and an outlet port for supplying the pressurized fluid medium at governor pressure to the automatic transmission. A combination of a valve member and an assembly of weights and springs is arranged within the chamber so that, as the output shaft rotates at increasing speeds, variable centrifugal forces are developed by the assembly of weights and springs and the position of the valve member is regulated to determine the governor pressure supplied to the output port. The valve member can be formed as one of the weights or as a separate valve spool. The assembly of weights and springs consists of at least three different weights and at least two different springs with each spring extending between a different pair of weights. Accordingly, by means of the arrangement of the weights, it is possible to change the governor pressure in three steps.

8 Claims, 7 Drawing Figures

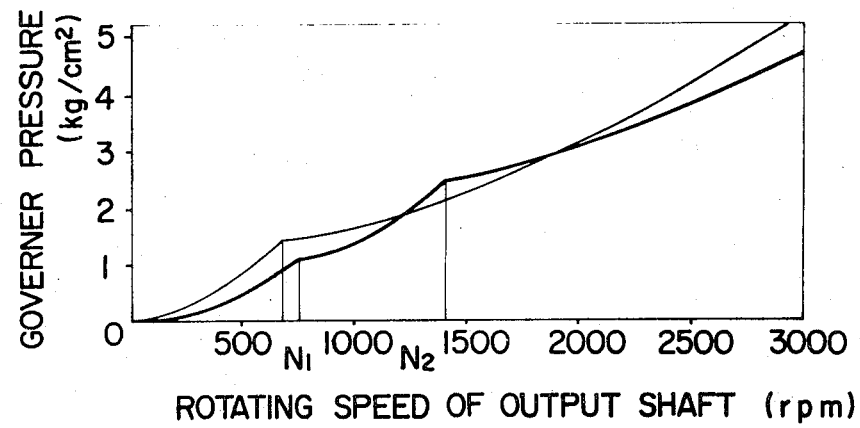
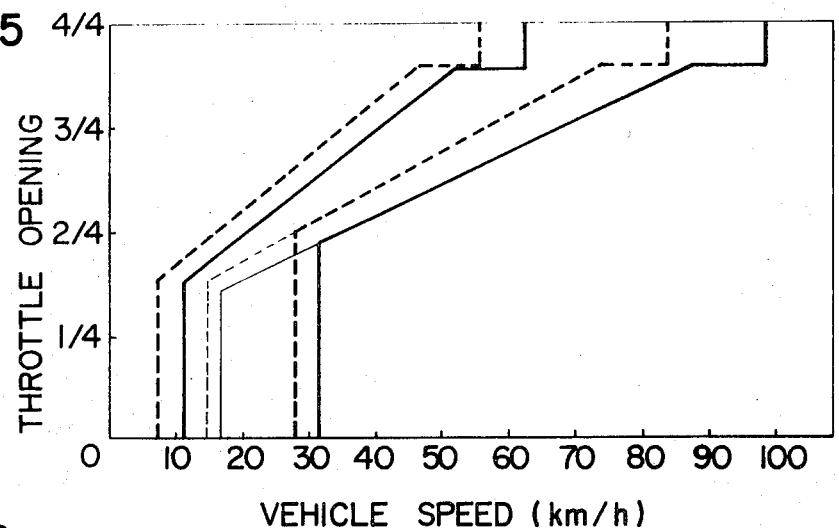
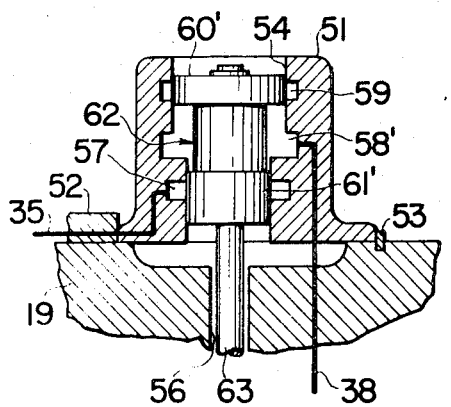
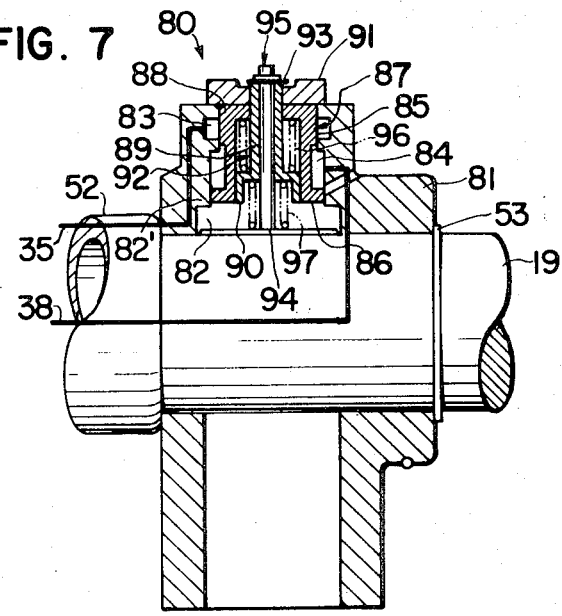

GOVERNOR VALVE ASSEMBLY FOR AN AUTOMATIC TRANSMISSION

BACKGROUND OF THE INVENTION

The present invention is directed to a governor valve for regulating the hydraulic pressure in accordacne with the rotational speed of the output shaft of a fluid type automatic transmission, such as used in vehicles, particularly in automobiles. More particularly, the invention relates to a governor valve capable of supplying the governor pressure in three separate steps.

Conventional governor assemblies used in automatic transmissions contain weights and the centrifugal force generated by the rotation of the output shaft acts on the weights in regulating the governor pressure. Accordingly, the characteristics of governor pressure are proportional to the square of the rotational speed of the output shaft. When the governor pressure is low, changes in governor pressure are small and the sensitivity of the governor is low. As a result, two-step governor valves employ two weights installed to detect vehicle speed minutely and accurately at the shifting point for obtaining sharp changes in governor pressure corresponding to the rotational speed of the output shaft conforming to the vehicle speed at the shifting point. Therefore, the shifting point between the first and second speeds and the shifting point between the second and third speeds when the engine output is small are set by approximating the vehicle speed corresponding to the sharp changes in governor pressure.

In recent years, with the emphasis on avoiding pollution, the prevention of exhaust gas from vehicles has attracted wide attention. Various devices for eliminating the exhaust of noxious gases even when a vehicle is moving have been proposed. However, if the engine output is small and the transmission is shifted into third speed when the vehicle speed is slightly increased from the second speed, as occurs in coventional three-speed automatic transmissions, knocking is likely to develop in the engine in the third speed range due to the low vehicle speed, with the result that the normal combustion of the fuel cannot take place and an increase in the exhaust of carbon monoxide and other noxious gases occurs. However, with the improvement of road conditions it has been possible to use four-speed automatic transmissions. Accordingly, when the shifting point between the second and third speeds is moved to the medium speed side and setting the shifting point between the third and fourth speeds by employing the governor pressure in a conventional two-step governor valve, it is inevitable to use at the shifting points such portions of the governor pressure that changes in oil pressure are smooth. Therefore, precise detection of vehicle speed cannot be determined and variations in the shifting points are easily caused, with the result that it is impossible to provide reliable speed changes. In view of these conditions, it is particularly desirable to obtain a three-step governor valve in which the governor pressure is changed in three separate steps. To date several types of such three-step governor valves have been proposed, however, they have left much to be desired from both practical and economical viewpoints.

SUMMARY OF THE INVENTION

A primary object of the present invention is to provide a three-step governor valve arrangement in which the centrifugal force acting on three weights is arranged to provide a three-step operation of the supply of governor pressure to the automatic transmission.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 5 is a diagrammatic showing of the hydraulic pressure control circuit of the automatic transmission;

FIG. 4 is a graphical representation of the relationship between the rotational speed of the output shaft and the governor pressure;

FIG. 5 is a graphical representation of the speed change patterns in a three-speed automatic transmission;

FIG. 6 is a partial sectional view of another embodiment of the governor valve assembly in accordance with the present invention; and FIG. 7 is a sectional view, similar to FIG. 3, illustrating yet another embodiment of the present invention.

DETAILED DESCRIPTION OF THE INVENTION

Figure 1:
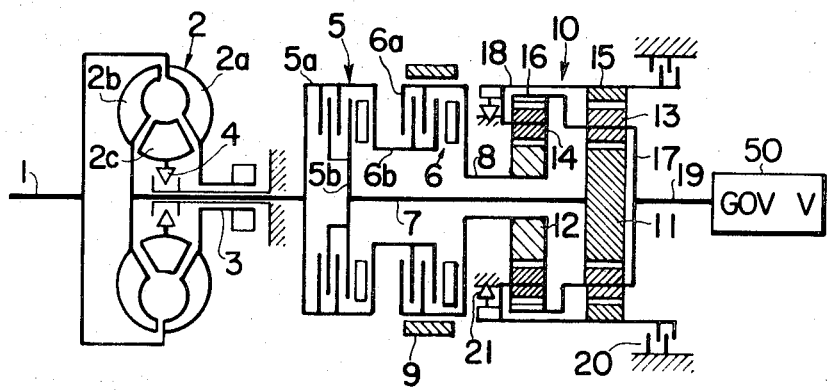
FIG. 1 is a schematic showing of an automatic transmission in which the governor valve assembly of the present invention is utilized.

In FIG. 1 an automatic transmission with three forward speeds and incorporating the governor valve assembly of the present invention, is illustrated. From the engine, a crank shaft is connected directly to a pump impeller 2a of a torque converter 2 and a turbine runner 2b of the torque converter is connected to an input shaft 3 for effecting the transmission of engine power. Additionally, the torque converter 2 is provided with a stator 2c which is connected to a one-way clutch 4 and is arranged to change the direction of oil flow. The input shaft 3 is connected to a clutch drum 5a of a primary clutch 5 and also to a clutch hub 6b of a secondary clutch 6. On the primary clutch 5, a clutch hub 5b is connected to a primary sun gear 11 of a planetary gear system 10 to a primary intermediate shaft 7. On the secondary clutch 6, a clutch drum 6a is connected through a secondary intermediate shaft 8 to a secondary sun gear 12 of the planetary gear system 10. The clutch drum 6a is provided with a primary brake 9 which consists of a band. In addition to the sun gears 11 and 12, the planetary gear system includes two sets of single pinion gears consisting of pinion gears 13 and 14 to be brought into planetary engagement with the sun gears 11 and 12 and ring gears 15 and 16 to be internally meshed with the pinion gears 13 and 14, respectively. A primary carrier 17 supporting the primary pinion gear 13 is integral with the secondary ring gear 16. The secondary carrier 18, which supports the secondary pinion gear, is integral with the primary ring gear 15. The primary carrier 17 is connected to an output shaft 19. The secondary carrier 18 is provided with a secondary brake 20 of disk clutch type and a one-way clutch 21 which is used for shifting into the first speed range when the engine brake is not applied. Mounted on the output shaft 19 is a governor valve 50.

In the above-described transmission, engine power is applied from the crank shaft 1 through the torque converter 2 to the input shaft 3. The planetary gear system 10 establishes three gear ratios including direct coupling as well as reverse speed conditions by the selective operation of two sets of clutches 5 and 6, two sets of brakes 9 and 20 and the one-way clutch 21. As a result, three forward speeds and one reverse speed can be obtained from the output shaft 19. By engaging the primary clutch 5 the input is applied to the primary sun gear 11. The first speed without engine brake is established by the action of the one-way clutch 21 and the first speed with engine brake is obtained by restricting the rotation of the primary ring gear by the action of the secondary brake 20. The secondary sun gear 12 is restrained from rotation by the action of the primary clutch 5 and the primary brake 9 and second speed is established. Third speed is established by applying an input to the secondary sun gear 12 through the secondary clutch 6. Further, reverse speed is provided by engaging the secondary clutch 6 and the secondary brake 20.

Figure 2:
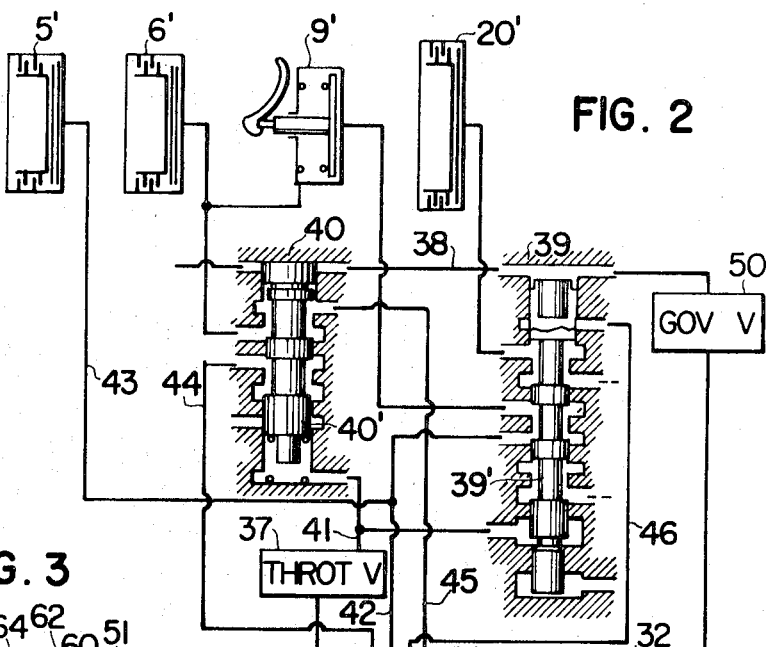

FIG. 2 shows the hydraulic pressure control circuit for shifting the automatic transmission described above. In FIG. 2, hydraulic servos 5' and 6' operate the primary and secondary clutches 5, 6, respectively. In addition, hydraulic servos 9', 20' operate the primary and secondary brakes 9, 20, respectively. The pressurized fluid medium, such as hydraulic fluid or oil, is pumped from an oil basin 30 by means of a oil pump 31 which is regulated by a pressure regulating valve 32. The pressurized fluid medium is supplied from the pump 31 and three separate flow paths for the pressurized fluid medium are provided, one flow path consists of a passage 33 for supplying the fluid medium into a manual valve 34, a second flow path consists of a passage 35 connecting the pump to the governor valve 50 and the third flow path is formed by a passage 36 connected to a throttle valve 37. As indicated in FIG. 1, the governor valve is mounted on the output shaft 19 so that the governor pressure is generated in accordance with the rotational speed of the output shaft and the governor pressure is applied through a passage 38 to a 1–2 shift valve 39 and a 2–3 shift valve 40. The throttle valve 37 is arranged so that a throttle pressure is generated in conformance with the throttle opening and the throttle pressure is supplied to both of the shift valves 39, 40 through an oil passage 41 acting in opposition to the governor pressure. The manual valve is arranged to change the operating conditions of the vehicle by a shifting operation through the drive, low and reverse speed ranges. The manual valve 34 is connected to the various parts of the hydraulic pressure control circuit in the following manner: to the operating side of the hydraulic servo 9' by a passage 42 extending through the 1–2 shift valve 39, to the hydraulic servo 5' through the passage 42 and the passage 43 which branches off of it, to the hydraulic servo 6' and the releasing side of the hydraulic servo 9' by means of a passage 44 extending through the 2–3 shift valve 40, to the 2–3 shift valve 40 by a passage 45, and to the hydraulic servo 20' via a passage 46 extending through the 1–2 shift valve 39.

Accordingly, when the manual valve 34 is shifted into the "drive range", the pressurized fluid medium is supplied into the passages 42, 43 and 44. In the first speed range, valve bodies 39' and 40' in the shift valves 39, 40 are situated in the upper positions by virtue of the throttle pressure, thus shutting off the passages 42, 44. Consequently, the pressurized fluid medium is supplied only into the hydraulic servo 5' through the passage 43 and the primary clutch is placed in engagement. As the speed of the vehicle increases, the valve body 39' in the 1–2 shift valve moves downwardly due to the governor pressure thus affording flow through the passage 42. Accordingly, the pressurized fluid medium flows into the hydraulic servo 9' for operating the primary brake 9 and establishing the second speed conditions. As the speed of the vehicle increases, the valve body 40' in the 2–3 shift valve moves downwardly and flow through the passage 44 is afforded. As a result, the hydraulic servo 9' returns to the released condition and the fluid medium flows into the hydraulic servo 6'. In this manner the secondary clutch is operated and establishes the third speed range. When the manual valve 34 is shifted into the reverse range, the pressurized fluid medium is supplied into the passages 45, 46. When this occurs, the valve bodies 39', 40' of the shift valves 39, 40 are located in the upper position and the fluid medium is supplied into the hydraulic servo 6' and 20' and the reverse speed conditions are established by the operation of the secondary clutch 6 and the secondary brake 20. When the manual valve 34 is shifted into the low range, the pressurized fluid medium flows into the passages 42, 43 and 46. Under such conditions, the valve body 39' of the 1–2 shift valve is situated in the upper position and flow through the passage 42 into the hydraulic servos 5', 20' is shut off. Consequently, the primary clutch is placed in engagement with the secondary brake and the first speed conditions are established by the engine brake.

The present invention is primarily directed to the governor valve assembly 50 used in a automatic transmission consisting of the transmission and hydraulic pressure control circuit described above. In one preferred embodiment of the invention, a body 51 is mounted, such as with bolts and the like, not shown, on the output shaft 19 of the transmission and any axial movement along the shaft is prevented by a support 52, located on one side of the body 51 and a snap ring 53 located on the other side. In this arrangement, the body 51 is secured to the output shaft so that it rotates with it. The body 51 is arranged on the output shaft 19 so that it extends radially outwardly from both sides of the shaft and forms a pair of chambers 54, 55 with the axes of the chambers extending transversely of the axis of the output shaft. Extending transversely through the output shaft 19 is a hole 56 which provides communication between the chambers 54, 55 on the opposite sides of the shaft. The chamber 54 forms the valve portion of the assembly while the chamber 55 contains the weights for effecting the control of the position of the valve portion.

Figure 3:
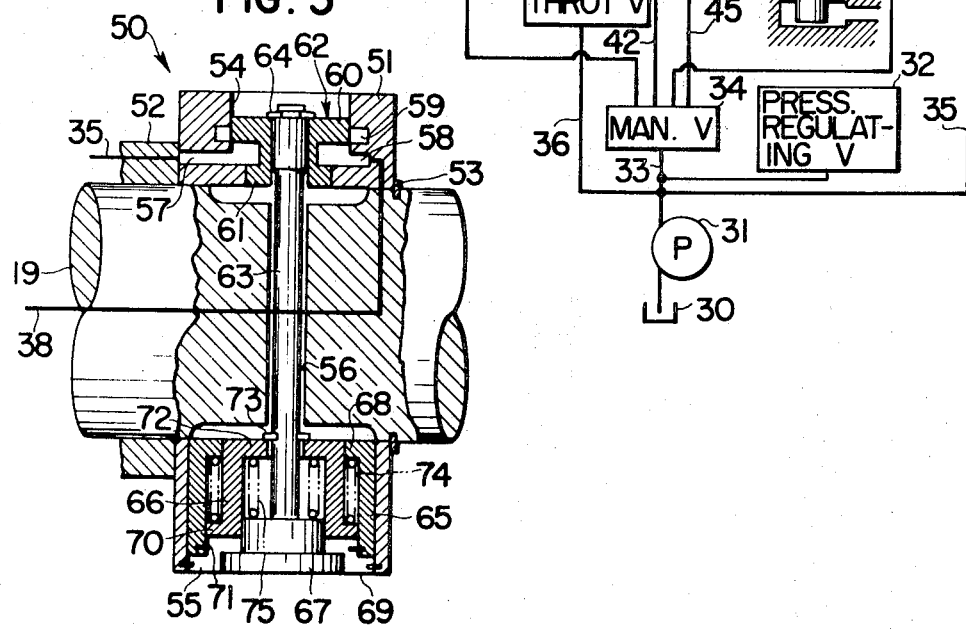
FIG. 3 is a sectional view of the governor valve assembly embodying the present invention mounted on the output shaft of the automatic transmission.

In the valve chamber 54 an input port 57 is connected with the passage 35, note FIG. 2, which supplies the pressurized fluid medium to the governor valve assembly from the pump 31. Further, the valve chamber contains an output port 58 in communication with the passage 38 for supplying the governor pressure to the 1-2 and 2-3 shift valves 39, 40. In FIG. 3 the input port 57 is located opposite the output port 58 and an exhaust port 59 is located outwardly from the input and output ports. Within the valve chamber 54 a valve spool 62 is located consisting of an outer land 60, more remote from the output shaft 19 than an inner land 61. The land 60 has a larger diameter than the land 61 and is in sliding contact with the inner surface of the valve chamber for opening and closing the exhaust port 59. The inner land 61 is in contact with an inwardly stepped surface of the valve chamber 54 and is in sliding contact with the surface for closing off the chamber 54 and the hole 56. As the output shaft 19 rotates, the action of the governor valve assembly permits the spool 62 to move in the direction transverse to the axial direction of the output shaft. Extending through the hole 56 in the output shaft 19 and into each of the valve chamber and the weight chamber is a shaft 63. Within the valve chamber 54, a retaining ring 64 secures the spool 62 to the end of the shaft 63. When the engine is started, the fluid medium, at a constant pressure, is supplied into the input port 57 and acts on both of the lands 60, 61 spaced apart by a groove. Due to the difference in diameter of the outer land 60 and the inner land 61, the spool 62 is moved outwardly from the position shown in FIG. 3 for admitting the pressurized fluid medium into the exhaust port 59. At this time, the centrifugal force due to the rotation of the spool 62 is balanced with the centrifugal force due to the rotation of the output shaft 19 and the pressurized fluid medium which is not exhausted is withdrawn from the valve chamber 54 as the governor pressure and is supplied from the output port 58 to the 1-2 and 2-3 shift valves.

The weight chamber 55 is cylindrically shaped and contains an assembly of weights and springs consisting of three weights 65, 66 and 67, each being of a different weight, and two springs 74, 75 each having a different spring force. The first weight 65 is the smallest of the three and has an annular or hollow cylindrical shape with its outer surface disposed in sliding contact with the surface of the weight chamber 55. At its inner end an inwardly directed projection 68 is formed on the first weight 65. Adjacent the outer end of the weight chamber, that is the end more remote from the output shaft 19, a snap ring 69 is set into the surface of the chamber for preventing the first weight 65 from being displaced outwardly, in the axial direction of the shaft 63, from the chamber 55.

Spaced radially inwardly from the first weight 65 is the second weight 66, which is larger than the first weight and has an annular or hollow cylindrical shape somewhat similar to that of the first weight. At its end closer to the output shaft, the second weight 66 is in sliding contact with the inwardly facing surface of the stepped portion 68 of the first weight 65 and at its opposite end, that is the end more remote from the output shaft 19, the second weight has an outwardly directed projection 70 which extends into contact with the inwardly facing surface of the first weight 65. To prevent the second weight 66 from being displaced axially outwardly from the weight chamber 55, a snap ring 71 is fitted into the inwardly facing surface of the first weight 65 adjacent its outer end. At its inner end, the second weight 66 has an inwardly directed projection 72 spaced closely from the shaft 63 and a snap ring 73 is seated within the shaft for preventing inward movement of the second weight toward the output shaft 19.

Completing the assembly of the weights is the third weight 67 secured integrally to the end of the shaft 63 located within the weight chamber 55. The inner surface of the third weight is spaced axially outwardly along the shaft from the outwardly facing surface of the projection 72 located on the second weight. In the arrangement of the weights, two pairs of the weights are in contact with one another, that is, the first weight 65 is in contact with the second weight 66 and, in turn, the second weight 66 is in contact with the centrally arranged third weight 67 at a position adjacent the outer end of the second weight.

Due to the arrangement of the inwardly directed projection 68 on the first weight and the outwardly directed projection 70 on the second weight an annular space is provided between the two weights in which a first spring 74 is located extending between the two spaced projections which form cooperating spring abutment surfaces on the first and second weights. Similarly, an annular space is provided between the inwardly facing surface of the second weight and the shaft 63 and a second spring 75 is located within the space and extends between the inwardly directed projections 72 on the second weight and the opposite disposed inwardly facing surface of the third weight 67 so that the projections 72 and the inwardly facing surface on the third weight form cooperating spring abutment surfaces on the second and third weights. The first spring 74 has a smaller spring force than that of the second spring 75. When the rotational speed of the output shaft 19 is low, due to the action of the springs 74, 75, first weight 65 and second weight 66 are forced or maintained within an inner position and provide a single weight condition acting on the spool member 62 at the opposite end of the shaft 63. The centrifugal force which occurs as the output shaft rotates is initially applied to the three weights 65, 66 and 67 and the two springs 74, 75. When the rotational speed of the output shaft is increased to a first predetermined value, the first weight 65, which is the smallest of the three weights, is displaced axially outwardly within the weight chamber 55, compressing the first spring 74, which has a smaller spring action or force than the second spring 75, and comes to rest against the snap ring 69 positioned in the surface of the weight chamber 55. When the first weight is displaced outwardly in this manner it no longer contributes to the centrifugal force acting on the spool member 62 within the valve chamber 54. At this point in the operation, the centrifugal force acting on the valve member is contributed by the two weights 66, 67 and the second spring 75.

As the rotational speed is increased and the next predetermined value is reached, the second weight 66 is displaced axially outwardly along the shaft 63, compressing the spring 75, and coming to rest against the snap ring 71 formed on the inner surface of the first weight 65. Accordingly, with its outward displacement, the second weight 66 no longer contributes to the centrifugal force acting on the valve member and above the second predetermined value the centrifugal force is supplied only by the third weight 67.

As shown in FIG. 4, when the output shaft is not rotating, the valve member effects the exhaust of all of the pressurized fluid medium through the exhaust port 59 and the governor pressure is kept at zero. As the rotational speed of the output shaft increases up to the first predetermined rotational speed $N_1$, the fluid medium force acting on the lands of the spool 62 is balanced by the centrifugal force of the combination of the three weights 65, 66 and 67 and the two springs 74, 75. The governor pressure increase along a quadratic curve and is supplied from the output port 58 in accordance with the corresponding increase in the rotational speed of the output shaft. From the point at which the first predetermined rotational speed $N_1$ is reached to the next predetermined rotational speed $N_2$, the force acting on the spool 62 within the valve chamber is balanced by the sum of the centrifugal forces developed by the second weight 66 and the third weight 67 and the second spring 75 and the spring force of the first spring 74 which acts against the second weight. Thus, the governor pressure increases along a quadratic curve having a slightly smaller increase rate than in the case mentioned above. After the rotational speed $N_2$ is attained, the force of the pressurized fluid medium acting on the spool 62 within the valve chamber is balanced by the sum of the centrifugal forces developed by the weight 67 and the spring forces of the springs 74 and 75. Again the governor pressure increases along a quadratic curve having still a smaller increase rate than previously was the case. Accordingly, the governor pressure is supplied in three steps with two intermediate points being provided where the pressure is sharply changed. In FIG. 4, the characteristic curve of a conventional two-step governor is shown in a full fine line.

In FIG. 5 the speed change patterns are illustrated in which the shifting points of the three-speed automatic transmissions are determined by utilizing the governor pressure changing in three steps as described above. In FIG. 5, the full fine line illustrates the case where a conventional governor pressure change in two steps is utilized. The full fine line shows a case of upshifting and the corresponding dotted line illustrates downshifting. As is apparent from FIG 5, when the vehicle speed corresponds to the predetermined rotating speeds $N_1$ and $N_2$ defining the points at which the governor pressure changes sharply, the shifting point between the first and second speeds where the throttle opening is small is clearly separated from the shifting point between the second and third speeds and a comparatively longer shifting point is provided for the second speed.

In the above-described first embodiment of the governor valve assembly, the valve member or spool 62 controls the exhaust pressure by adjusting the opening of the exhaust port 59 by means of a larger diameter outer land 60 and thereby establishing the governor pressure supplied through the output port 58. In FIG. 6 another embodiment of the governor valve assembly is shown, however, only the portion which is different from the assembly shown in FIG. 3 is illustrated in FIG. 6. In this embodiment, within the valve chamber 54, the output port 58' is located axially outwardly from the input port 57 and axially inwardly from the exhaust port 59. The larger diameter outer land 60' of the spool 62 closes the exhaust port 59 during normal operation and opens the exhaust port only in the case where the oil pressure supplied is abnormally high. The smaller diameter inner land is arranged to adjust the opening of the inner port 57. Therefore, when the rotational speed of the output shaft is increased and the centrifugal force acting on the spool 62 is also increased, the spool is drawn inwardly and the position of the inner land 61' determines the opening of the input port and admits the flow of pressurized fluid medium to the output port 58 which acts as the governor pressure within the control circuit.

In FIG. 7 a third embodiment of the present invention is illustrated where the valve member and the weight and spring assembly are combined for controlling the supply of governor pressure into the control circuit. In FIG. 7, a governor valve 80 includes a body 81 mounted on the output shaft 19 and secured against axial movement on the shaft on one side by a support 52 and on the opposite side by a snap ring 53, similar to the arrangement shown in FIG. 3. The body 81 forms a chamber having a stepped surface with its smaller diameter at the end spaced more remote from the output shaft and its larger diameter at the end adjoining the output shaft. An input port 83 is provided in the body 81 for supplying pressurized fluid medium into the chamber 82 and an output port 84 removes the governor pressure from the chamber. Positioned within the chamber 82 is a cylindrically shaped first weight 87 with a valve element portion 85 disposed in sliding contact with the surface of the chamber for opening and closing the input port 83. Spaced inwardly from the valve element portion 85 is a stepped portion 86 which projects outwardly into contact with the surface of the chamber. The stepped portion 86 forms the inner limiting structure of an annular space defined at its opposite end by the valve element portion 85 and from which space the fluid medium is supplied to the output port 84. An annularly shaped second weight 92 is located within the first weight 87 and has a body portion 89 in slidable engagement with an inwardly stepped projection 88 of the first weight 87. In addition an outwardly stepped portion 90 of the second weight is located at its end closer to the output shaft 19 and is disposed in sliding contact with the inner surface of the end of the first weight at which the stepped portion 86 is located. At the axially outer end of the second weight a weight portion 91 is provided located axially outwardly of the first weight. The weight assembly is completed by a third weigh 95 extending through the second weight 92 and having a retaining ring 93 at its axially outer end for preventing the second weight 92 from being displaced outwardly from the chamber 82. Further, a stop member 94 is provided at the inner end of the shaft-like third weight 95 and the stop member has a diameter of such a size that it limits the outward displacement of the third weight. A first spring 96 is positioned in the space between the first weight and the second weight and acts at its axially inner end against the stepped portion 90 on the second weight and at its outer end against the inwardly directed projection 88 on the first weight 87. A second spring 97 is located about the shaft-like portion of the third weight 95 and extends between the stepped portion 90 of the second weight and the inwardly spaced stop member 94 of the third weight.

When the output shaft 19 is rotated, the three weights 87, 92 and 95 in combination with the springs 96, 97 develop a centrifugal force which tends to move them outwardly through the chamber 82 away from the shaft 19. Consequently, the valve element portion 85 of the first weight 87 opens the input port 83 and directs the pressurized fluid medium into the output port 84 thus providing a counteracting force to the centrifugal force. The pressure of the fluid medium determined by the balance of the forces acting on the assembly is supplied to the control circuit as the governor pressure. When the speed of rotation of the shaft is low, the three weights 87, 92 and 95 along with the springs 96, 97 act as a single weight in developing the centrifugal force. When the first predetermined rotational speed $N_1$ is reached, the third weight 95 is displaced axially outwardly and the stop member 94 moves into engagement with the stepped portion 82' within the chamber 82. When the rotational speed exceeds $N_1$, the third weight acts in combination with the body 81 and no longer affords a centrifugal force acting on the valve portion 85. When the rotational speed $N_1$ is reached, the governor pressure is determined by the sum of the centrifugal forces developed by the weights 87, 92 and the spring force of the second spring 97. When the next predetermined rotational speed $N_2$ is reached, the second weight 92 is displaced axially outwardly until it is stopped by the retaining ring 93 and combines with the third weight 95 as a single unit. When the rotational speed $N_2$ is attained, a governor pressure is established by the sum of the centrifugal force developed by the first weight 87 and the spring forces of the springs 96 and 97. Accordingly, in this arrangement the governor pressure is changed in three steps in the manner shown in FIG. 4.

As indicated by the three embodiments described above, the invention can change the governor pressure in three steps so that the shifting point between the second and third speeds in the speed change patterns of an automatic transmission is transferred to a point where the vehicle speed is high. This feature is quite advantageous for preventing exhaust gas when shifting to higher speeds and for determining the speed change patterns of four-speed automatic transmissions. The governor valve assembly in accordance with the present invention, consists only of three weights and two springs and, as a result, the assembly is very simple in construction. Further, it is possible to change the characteristics of the governor pressure in a simple manner by changing the spring force while keeping the weight loads constant. Furthermore, the governor pressure changing in more than three stops can be easily obtained by increasing the combination of the weights and springs.

While specific embodiments of the invention have been shown and described in detail to illustrate the application of the inventive principles, it will be understood that the invention may be embodied otherwise without departing from such principles.

What is claimed is:

1. In a governor valve assembly for use with an automatic transmission including an output shaft, said valve assembly including an inlet passage for introducing a pressurized fluid medium into said governor valve assembly and an outlet passage for supplying governor pressure from said governor valve assembly to said automatic transmission, the improvement comprising, in combination, wall means arranged to be secured to said output shaft for forming chamber means having an input port communicating with said inlet passage and an output port communicating with said outlet passage, means arranged within said wall means for rotation with said output shaft, said means including a valve member arranged for displacement within said chamber means in the direction extending radially of the axis of rotation of said output shaft for controlling flow through said chamber means between said input port and said output port, said means including an assembly of weights and springs located within said wall means and arranged for displacement in the direction extending radially of the axis of rotation of said output shaft, said assembly of weights and springs being operatively associated with said valve member for controlling flow between said input port and said output port in accordance with the radial displacement of said assembly of weights and springs during rotation of said output shaft, said assembly of weights and springs comprising a first, a second and a third weight each of a different weight with at least two of said weights each arranged to be displaced separately relative to the others in the radial direction outwardly from said output shaft under a different centrifugal force generated by the rotation of said output shaft, and a first and a second spring each having a different spring force, said first spring being engaged between spring abutment surfaces on said first and said second weight and said second spring being engaged between spring abutment surfaces on said second and said third weights so that as the centrifugal force increases with increased rotational speed of said output shaft, individual ones of said weights are displaced radially outwardly against the force of said spring associated therewith and the displaced said weight is no longer effective in developing centrifugal force which effects the regulation of flow between said input port and said output port.

2. A governor valve assembly, as set forth in claim 1, wherein said chamber means comprises a first chamber located on one side of and extending radially outwardly from said output shaft and a second chamber located on the opposite side of and extending radially outwardly from said output shaft, said input port and said output port arranged in communication with said first chamber, said means arranged within said wall means comprises a shaft extending through said output shaft and between said first and second chambers, said valve member mounted on said shaft and located within said first chamber, and said assembly of weights and springs located within said second chamber.

3. A governor valve assembly, as set forth in claim 2, wherein said first chamber has a cylindrical shape with an inwardly stepped surface located adjacent said output shaft and radially inwardly of said input and output ports, said valve member comprises a spool mounted on said shaft, the lateral surface of said spool having a first land and a second land with said first land spaced radially inwardly of said second land and said first and second land spaced apart by an annular groove, said first land having a diameter less than the diameter of said second land so that it can seat in contacting relationship with the inwardly facing surface of said inwardly stepped surface in said first chamber.

4. A governor valve assembly, as set forth in claim 2, wherein said first chamber has a cylindrical shape with an inwardly stepped surface located adjacent said output shaft and radially inwardly of said input and output ports, said valve member comprises a spool mounted on said shaft, the lateral surface of said spool having a first land and a second land with said first land spaced radially inwardly of said second land and said first and second land spaced apart by an annular groove, said first land having a diameter less than the diameter of said second land so that it can seat in contacting relationship with the inwardly facing surface of said inwardly stepped surface, in said first chamber and said inlet port is located inwardly toward said output shaft from said output port, an exhaust port is located outwardly from said output port, said second land arranged to close said exhaust port during normal operating conditions and said inlet port located opposite said first land and arranged to increase the opening of said input port in response to increased centrifugal force developed by said assembly of weights and springs for increasing the flow admitted to said outlet port.

5. A governor valve assembly, as set forth in claim 1, wherein means are associated with said output shaft for preventing said wall means from being axially displaced on said output shaft.

6. A governor valve assembly, as set forth in claim 1, wherein said chamber means comprises a single chamber located on one side of and extending radially outwardly from said output shaft, said chamber having a cylindrical shape with its inner surface located closer to said output shaft being stepped radially outwardly relative to the remainder of the inner surface of said chamber located more remotely from said output shaft, said first weight being annularly shaped and positioned within said chamber and being axially elongated in the direction transverse to said output shaft, said first weight having a first land and a second land located on its radially outer surfaces spaced apart by a groove, said first land being spaced inwardly of said second land and located closer to said output shaft, said first land having a diameter greater than the diameter of said second land and being disposed in contacting sliding relationship with the outwardly stepped inner surface of said chamber, said second land being disposed in contacting sliding relationship with the inner surface of said chamber located outwardly from the outwardly stepped inner surface thereof, said first weight having an inwardly directed projection positioned at its end more remote from said output shaft, said first weight acting as said valve member for regulating flow between the input port and output port of said valve assembly, said second weight being annularly shaped and positioned within said chamber and axially elongated in the direction transverse to said output shaft, said second weight located radially inwardly from said first weight, an outwardly directed projection formed on the end of said second weight closer to said output shaft and extending into sliding engagement with the inner surface of said first weight, the inwardly facing surface of said inwardly directed projection on said first weight being in sliding contact with the outer surface of said second weight spaced outwardly from the outwardly directed projection on said second weight, said third weignt having said elongated shaft-like cónfiguration positioned within said second weight and extending transversely of said output shaft, said third weight including a first stop member mounted on its inner end for preventing outward displacement of said second weight from said chamber and a second stop member mounted on its inner end and having a diameter larger than the diameter of said first land on said first weight, the inner surface of said chamber adjoining said output shaft being stepped outwardly relative to the surface thereof in sliding contact with said first land, the outward displacement of said second stop member being limited by the axial length of the outwardly stepped surface of said chamber adjoining said input shaft, said first spring extending in the axial direction of said chamber with its end closer to said output shaft disposed in contact with the surface of the outwardly directed projection on said second weight facing outwardly away from said output shaft and its other end disposed in contact with the inwardly directed projection on said first weight, said second spring extending in the axial direction of said chamber with its end closer to said output shaft disposed in contact with said second stop member on said third weight and its other end disposed in contact with the surface of the outwardly directed projection on said second weight facing inwardly toward said output shaft.

7. A governor valve assembly, as set forth in claim 3, wherein said assembly of weights and springs is positioned within said second chamber, said first weight being annularly shaped and laterally encircling and spaced outwardly from said shaft, said first weight extending in the axial direction of said shaft within said second chamber and having an annularly shaped inwardly directed projection at its end closer to said output shaft, first stop means in said second chamber for preventing said first weight from being displaced outwardly from said second chamber, said second weight being annularly shaped and laterally encircling and spaced laterally outwardly from said shaft, said second weight extending in the axial direction of said shaft within said second chamber and having an annularly shaped inwardly directed projection at its end closer to said output shaft and an annularly shaped outwardly shaped projection at its end more remote from said output shaft, second stop means associated with said first weight for preventing said second weight from being displaced outwardly from said second chamber, said third weight being mounted on said shaft in spaced relationship outwardly from said output shaft relative to the inner ends of said first and second weights, the end of said third weight closer to said output shaft being disposed within said second weight, said first spring extending in the axial direction of said shaft and located between said first weight and said second weight with one end of said spring bearing against the inwardly directed projection on said first weight and the other end bearing against the outwardly directed projection on said second weight, and said second spring extending in the axial direction of said shaft and located between said second weight and said shaft with one end of said second spring bearing against the inwardly directed projection on said second weight and the other end bearing against the surface of said third weight.

8. A governor valve assembly, as set forth in claim 7, including third stop means mounted on said shaft in said second chamber adjacent said output shaft for preventing the inward displacement of said second weight.

* * * * *